(12) United States Patent
Priel

(10) Patent No.: US 11,960,604 B2
(45) Date of Patent: Apr. 16, 2024

(54) ONLINE ASSETS CONTINUOUS MONITORING AND PROTECTION

(71) Applicant: CYBERINT TECHNOLOGIES LTD., Petach Tikva (IL)

(72) Inventor: Shay Priel, Nes Ziona (IL)

(73) Assignee: BANK LEUMI LE-ISRAEL B.M., Herzelia (IL)

( * ) Notice: Subject to any disclaimer, the term of this patent is extended or adjusted under 35 U.S.C. 154(b) by 1100 days.

(21) Appl. No.: 16/316,574

(22) PCT Filed: Jul. 9, 2017

(86) PCT No.: PCT/IL2017/050767
§ 371 (c)(1),
(2) Date: Jan. 9, 2019

(87) PCT Pub. No.: WO2018/011785
PCT Pub. Date: Jan. 18, 2018

(65) Prior Publication Data
US 2020/0125729 A1    Apr. 23, 2020

Related U.S. Application Data

(60) Provisional application No. 62/360,397, filed on Jul. 10, 2016.

(51) Int. Cl.
*G06F 21/00* (2013.01)
*G06F 16/951* (2019.01)
*G06F 21/56* (2013.01)
(52) U.S. Cl.
CPC .......... *G06F 21/566* (2013.01); *G06F 16/951* (2019.01); *G06F 21/564* (2013.01)

(58) Field of Classification Search
CPC ..... G06F 21/564; G06F 21/566; G06F 16/951
See application file for complete search history.

(56) References Cited

U.S. PATENT DOCUMENTS 7,865,953 B1 *  1/2011  Hsieh .................. G06F 16/9566
                                                          726/4
8,484,740 B2    7/2013  Gerber et al.
(Continued)

FOREIGN PATENT DOCUMENTS

CN         103632084 A      3/2014

*Primary Examiner* — Jeffrey C Pwu
*Assistant Examiner* — Thong P Truong
(74) *Attorney, Agent, or Firm* — Muncy, Geissler, Olds & Lowe, P.C.

(57) ABSTRACT

The present invention relates to a method and system for monitoring webpages for detecting malicious contents. According to a preferred embodiment the method comprises A) providing a plurality of URLs provided by a subscriber, employing a crawler to visit a URL webpage of said plurality of URLs; B) retrieving an object from said URL webpage by said crawler; C) analyzing said object retrieved by said crawler from said URL webpage, and determining whether said object retrieved is malicious or not; and D) alerting the subscriber, when said retrieved object is deemed malicious. According to one embodiment, the method further comprises E) employing a crawler to visit a URL webpage of a following URL of the plurality of URLs, when the determination of step C) is deemed not malicious; and F) returning to step B).

3 Claims, 12 Drawing Sheets

(56) References Cited

U.S. PATENT DOCUMENTS

| | | | |
|---|---|---|---|
| 2012/0167220 A1* | 6/2012 | Jeong | G06F 21/563 |
| | | | 726/24 |
| 2012/0254333 A1* | 10/2012 | Chandramouli | G06F 40/10 |
| | | | 709/206 |
| 2014/0280570 A1* | 9/2014 | Sutton | H04L 63/20 |
| | | | 709/204 |
| 2015/0082424 A1 | 3/2015 | Shukla | |
| 2015/0180829 A1* | 6/2015 | Yu | H04L 63/083 |
| | | | 726/11 |
| 2015/0200962 A1 | 7/2015 | Xu et al. | |
| 2015/0347756 A1* | 12/2015 | Hidayat | H04L 63/1441 |
| | | | 726/22 |
| 2016/0055490 A1* | 2/2016 | Keren | G06Q 30/00 |
| | | | 705/14.47 |

\* cited by examiner

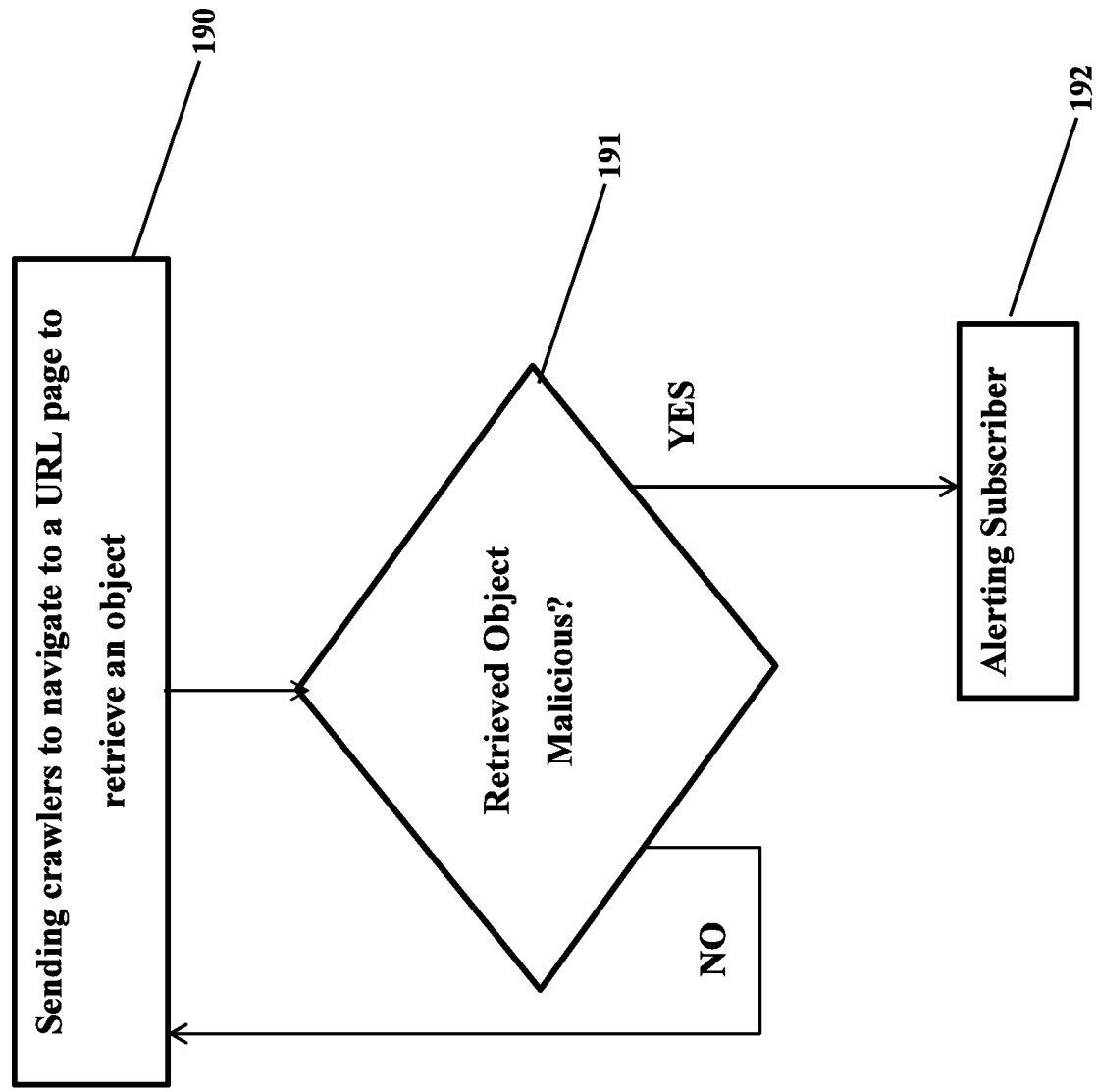

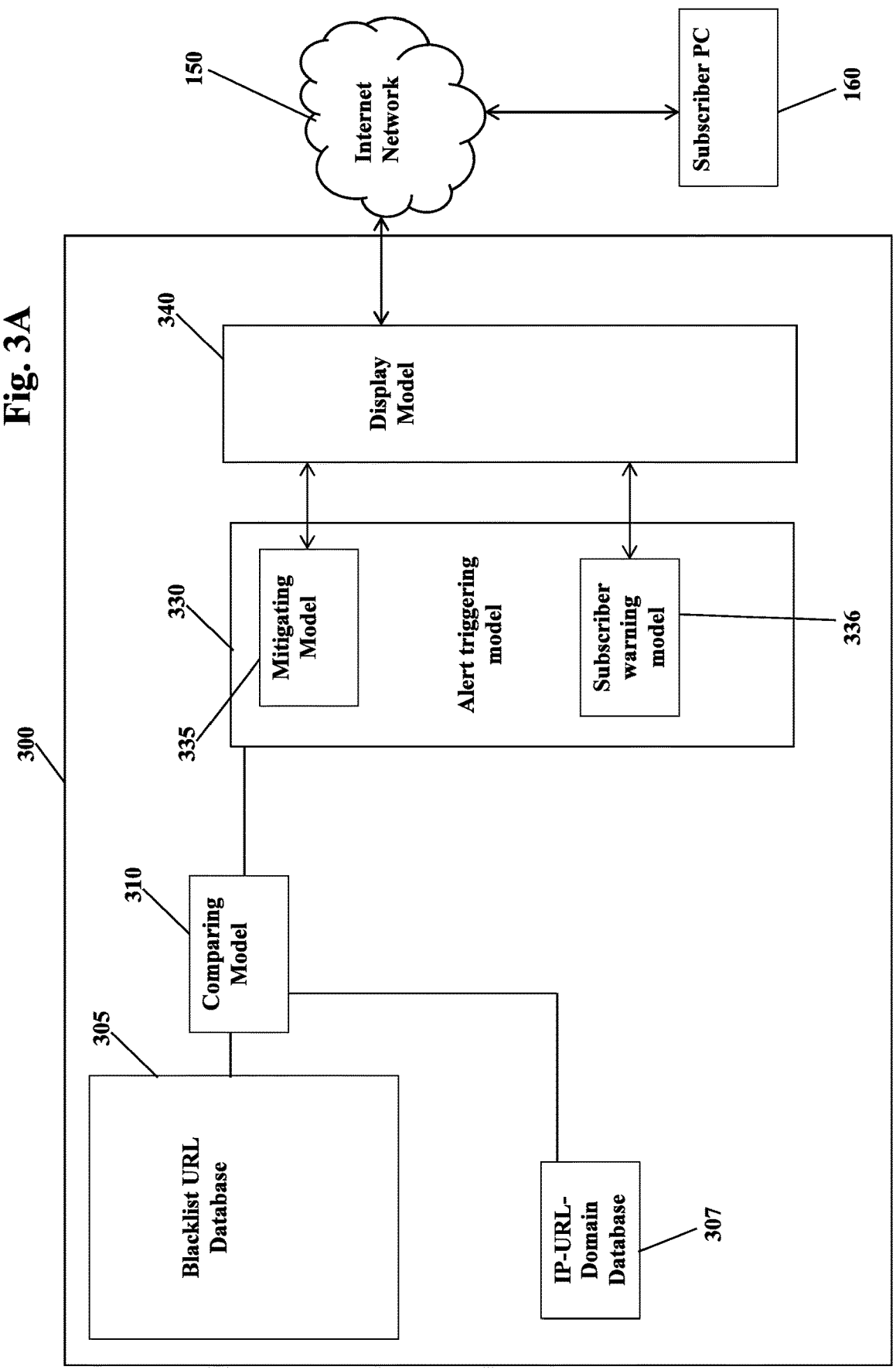

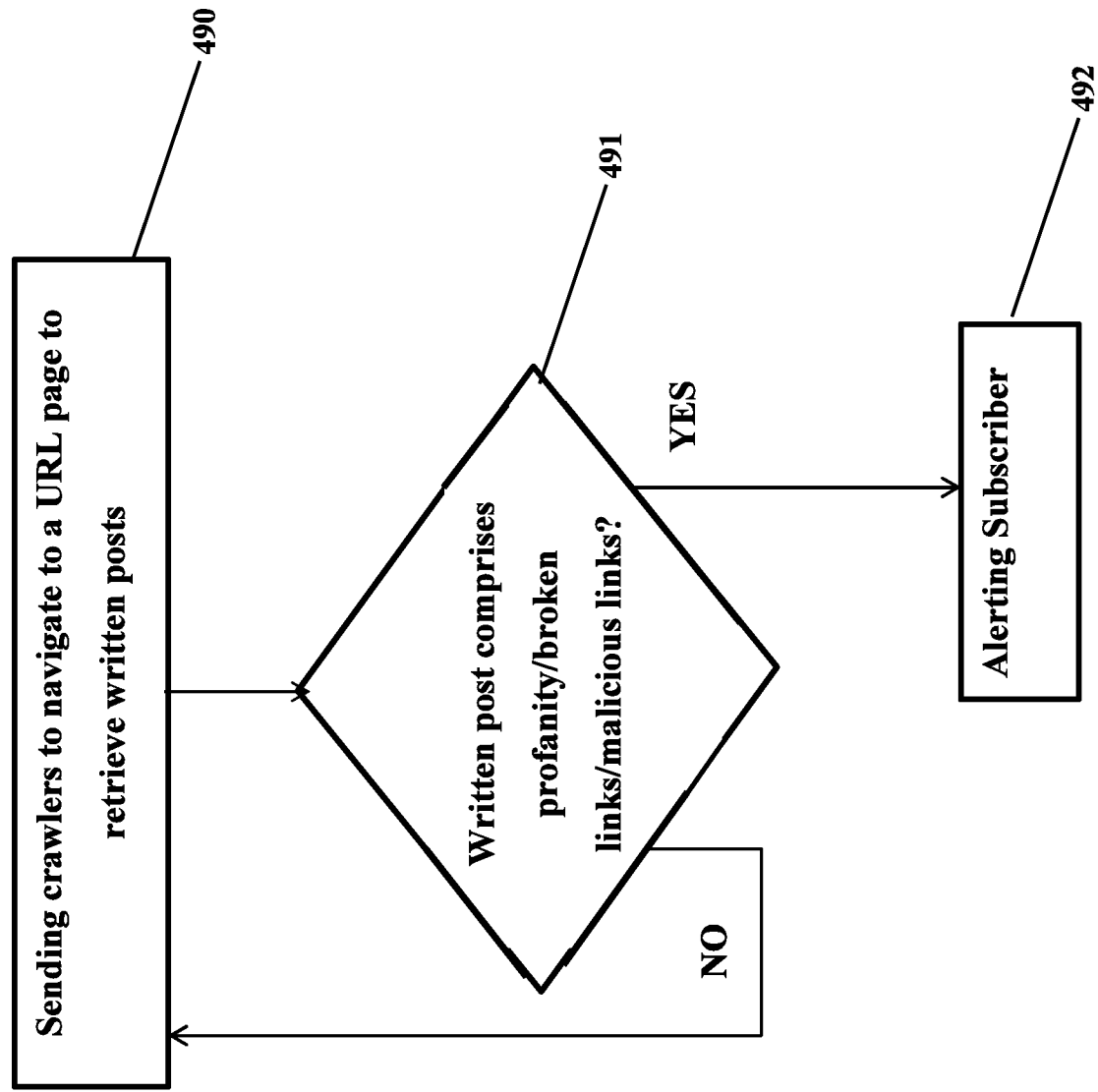

Fig. 6

ONLINE ASSETS CONTINUOUS MONITORING AND PROTECTION

FIELD OF THE INVENTION

The present invention relates to the field of computer security. More particularly, the present invention relates to protecting online assets from malicious content.

BACKGROUND OF THE INVENTION

Several corporate bodies, companies, businesses and various organizations possess a plurality of online assets.

Online presence has changed substantially over the last decade. Companies, businesses and other organizations have engagements with customers, members and users on social media such as in websites and on blogs. While this change is good for business, the potential risks associated with it are substantial. As cyber criminals and hacktivists grow more sophisticated, they utilize these online assets as an attack vector into the organizations by applying malicious content into the online assets.

Once an online asset has been compromised, the response time (and damage incurred) is measured in seconds. The social media accounts, blogs, and websites have emerged as the digital front lines of the 21st century.

It is therefore an object of the present invention to provide a method and means for monitoring online assets and alerting in case of a malicious attack.

It is a further object of the present invention to provide a method and means to mitigate malicious attacks once they occur.

It is yet a further object of the present invention to provide a method and means for monitoring and protecting various online assets in real-time.

Other objects and advantages of the present invention will become apparent as the description proceeds.

SUMMARY OF THE INVENTION

The present invention relates to a method and system for monitoring and scanning online assets and producing alerts and reports for malicious activities. Malicious activities may include defacements, fraud, spamming, malware drop-off, links to phishing sites, account take over and more. Once a malicious activity is identified, alerts are disseminated automatically for immediate mitigation or in some cases automatically mitigated.

While several threats are discovered days or even months after they occur the present invention enables detection of compromised online assets and response in real time, monitoring online assets from one central location, reaction to malicious activity in real time, protection of a subscriber's employees, users and followers. The present invention enables comprehensive and continuous monitoring, enables a timely and effective response to any malicious activity before it compromises a subscriber's assets.

The present invention relates to scanning online assets regularly. The online assets may be web properties, websites/blogs, social media networks, DNS records, brands, IP addresses, official pages, social network accounts, and blogs. The present invention is configured to cope with mimic user behavior using browser sand-boxing capabilities, cope with defacements, phishing attempts and other malicious activities. The present invention is configured to take mitigating action in real time and protect subscribers brand and stakeholders.

The present invention relates to brand protection by scanning community pages that copy a subscriber's brand, possibly damaging it in various ways, including creating fake pages in order to lure clients, etc. this protects the brand and its reputation.

The present invention relates to a system and method for monitoring online assets (e.g. websites, blogs) for detecting malicious contents, the method to be performed by a computer system and comprises:
  A) providing a plurality of URLs provided by a subscriber, sending crawler(s) to navigate to a URL page of the plurality of URLs, to retrieve objects from the plurality of URLs;
  B) analyzing objects retrieved by the crawlers from the page of the currently visited URL, to identify whether they are malicious or not;
  C) if the analyzed objects are deemed not malicious, sending crawler(s) to navigate to the next URL page to retrieve an object therefrom; and return to step B;
  D) if the analyzed object is deemed malicious, alerting the subscriber of so.

Preferably, the method analyzing in step B is implemented by cross-referencing the currently retrieved object with a set of known stored malicious objects.

The present invention comprises monitoring the online assets and comparing contents therefrom with known malicious items (e.g. stored in a database, or provided by an external database/external factor).

Optionally, the monitoring can be implemented by occasionally checking objects (e.g. JavaScripts) of the online assets and making sure that they have not been changed.

The present invention further comprises receiving IP addresses of a subscriber's assets, the subscriber's UTRLs and domains (e.g. used for the subscriber's websites, blogs, social networks, etc.) and checking if they appear in blacklists (preferably blacklists online).

The present invention further comprises monitoring a subscriber's social networks to check if someone has posted a post comprising profanity, comprising a broken link, or comprising a malicious link.

The present invention further comprises searching the web to check if someone has created a deceiving fake page posing as a page of the subscriber.

The present invention comprises warning the subscriber in case at least one of the aforementioned conditions are met. Optionally, the subscriber can take an actionable step according to the threat detected to mitigate the threat and alter the current state back to the normal desirable state.

The present invention relates to a method for monitoring webpages for detecting malicious contents comprising:
  A) providing a plurality of URLs provided by a subscriber, employing a crawler to visit a URL webpage of said plurality of URLs;
  B) retrieving an object from said URL webpage by said crawler;
  C) analyzing said object retrieved by said crawler from said URL webpage, and determining whether said object retrieved is malicious or not;
  D) alerting the subscriber, when said retrieved object is deemed malicious.

Preferably, the method further comprises:
  E) employing a crawler to visit a URL webpage of a following URL of the plurality of URLs, when the determination of step C) is deemed not malicious; and
  F) returning to step B).

Preferably, determining whether the object retrieved is malicious or not comprises cross-referencing the retrieved object with a set of stored malicious objects comprising malicious vulnerabilities, wherein the object retrieved is deemed malicious if it comprises one or more of said malicious vulnerabilities.

Preferably, the retrieved objects are webpage contents selected from the group consisting of interpreted run-Lime language code, JavaScript, webpage HTML and binary files.

Preferably, the method further comprises:
employing a crawler to visit a subdomain of the URL webpage visited;
returning to step B).

Preferably, the method further comprises, mitigating the malicious threat, when the retrieved object is deemed malicious.

Preferably, alerting the subscriber comprises sending an alert via the internet.

Preferably, alerting the subscriber comprises sending a display model indicative of items selected from the group consisting of the malicious object, said malicious object corresponding description of vulnerability and said malicious object corresponding information on its mitigation.

Preferably, the method comprises an initial step comprising:
i) employing the crawlers to visit the webpages of the provided plurality of URLs;
ii) retrieving webpage content comprising interpreted run-time language code of the visited webpages;
iii) storing said retrieved webpage content;
wherein the object in step B) comprises interpreted run-time language code of the visited webpage;
and wherein the analyzing in step C) comprises:
comparing the retrieved interpreted run-time language code of the visited webpage with the retrieved and stored interpreted run-time language code of the webpage of the corresponding URL of the initial step, wherein the determining is deemed malicious, when said comparing result between the two is not equal.

Preferably, the determining is deemed not malicious, when said comparing result between the two is equal.

Preferably, the method further comprises, mitigating the malicious threat, when the retrieved object is deemed malicious.

Preferably, alerting the subscriber comprises sending a display model indicative of details of the detected changed interpreted run-time language code.

Preferably, the retrieved object comprises a written content;
wherein the determination of the object retrieved being malicious is when at least one of the following is held true:
i) said retrieved written content comprises at least one profanity content of a stored profanity words or combinations list;
ii) said retrieved written content comprises a broken link;
iii) said retrieved written content comprises at least one malicious link of a stored malicious links database;
iv) said retrieved written content comprises at least one keyword of a stored malicious keyword database.

Preferably, the plurality of URLs are of websites of social network accounts.

Preferably, the method further comprises, mitigating the malicious threat, when the retrieved object is deemed malicious by one of the following steps:
delete or hide the profanity words or combinations from the webpage or delete the entire content, when the written content comprises at least one profanity content;
delete or hide the broken link from the webpage or delete the entire content, when the written content comprises a broken link;
delete or hide the malicious link from the webpage or delete the entire content, when the written content comprises a malicious link;
delete or hide the malicious keyword from the webpage or delete the entire content, when the written content comprises a malicious keyword.

Preferably, alerting the subscriber comprises sending a display model indicative of details of the written content.

The present invention relates to a method for monitoring blacklists on the web comprising:
A) providing a plurality of URLs that their web pages comprise a blacklist, navigating to a URL webpage of said plurality of URLs;
B) providing a list of a subscriber's computer related asset codes from the group consisting of IP addresses, URLs and Domains, cross-referencing said computer related asset codes with IP addresses, URLs and Domains that appear in the blacklist of the URL website, and determining if said computer related asset codes appear in said blacklist of the URL website;
C) alerting the subscriber, when the determining is deemed positive.

Preferably, the method further comprises:
D) navigating to a following URL webpage of the plurality of URLs, when the determining is deemed negative; and
E) returning to step B).

Preferably, the method further comprises submitting a request to be taken off the blacklist, when the determining is deemed positive.

Preferably, alerting the subscriber comprises sending an alert via the internet.

Preferably, alerting the subscriber comprises sending a display model indicative of the computer related asset code appearing in the blacklist.

Preferably, the blacklists are either spam blacklists or malware blacklists.

The present invention relates to a method for monitoring the web for fake webpages comprising:
A) providing a plurality of subscriber related keywords stored in a keyword database, employing a crawler to perform a search in an online search engine using a keyword from said keyword database and retrieve a list of URLs of webpages that match said keyword;
B) employing one or more crawlers to visit the retrieved URL webpages;
C) analyzing the contents of the webpages of the retrieved URLs and determining if they are fake webpages or not;
D) alerting the subscriber, when a webpage of the retrieved URLs is determined as a fake page.

Preferably, the method further comprises:
E) when the determination of step C) is deemed that the webpages are not fake pages, employing a crawler to perform a search in an appropriate online search engine using the following keyword from the keyword database and retrieve a list of URLs of webpages that match said following keyword, and
F) returning to step B).

Preferably, the analyzing comprises using algorithms that employ texts similarities or image processing or content analyzing.

Preferably, the search engine is dedicated for searching social media webpages;

and wherein the URL webpages are social media webpages; wherein the analyzing comprises:
  obtaining the content posted by the social media webpage owner;
  comparing said obtained content with a database comprising malicious content and determining whether the obtained content comprises the malicious content.

Preferably, the method further comprises, informing the hosting provider of the fake webpage to permanently remove it, when a webpage of the retrieved links is determined as a fake page.

Preferably, alerting the subscriber comprises sending a display model indicative of details of the fake page.

The present invention relates to a system, comprising:
  a processor;
  a memory coupled to the processor and configured to store program instructions executable by the processor to implement the method for monitoring webpages for detecting malicious contents comprising:
  A) providing a plurality of URLs provided by a subscriber, employing a crawler to visit a URL webpage of said plurality of URLs;
  B) retrieving an object from said URL webpage by said crawler;
  C) analyzing said object retrieved by said crawler from said URL webpage, and determining whether said object retrieved is malicious or not;
  D) alerting the subscriber, when said retrieved object is deemed malicious.

Preferably, the system is such that the method for monitoring webpages for detecting malicious contents further comprises:
  E) employing a crawler to visit a URL webpage of a following URL of the plurality of URLs, when the determination of step C) is deemed not malicious; and
  F) returning to step B).

The present invention relates to a system, comprising:
  a processor;
  a memory coupled to the processor and configured to store program instructions executable by the processor to implement the method for monitoring blacklists on the web comprising:
  A) providing a plurality of URLs that their web pages comprise a blacklist, navigating to a URL webpage of said plurality of URLs;
  B) providing a list of a subscriber's computer related asset codes from the group consisting of IP addresses, URLs and Domains, cross-referencing said computer related asset codes with IF addresses, URLs and Domains that appear in the blacklist of the URL website, and determining if said computer related asset codes appear in said blacklist of the URL website;
  C) alerting the subscriber, when the determining is deemed positive.

Preferably, the system is such that the method for monitoring blacklists on the web further comprises:
  D) navigating to a following URL webpage of the plurality of URLs, when the determining is deemed negative; and
  E) returning to step B).

The present invention relates to a system, comprising:
  a processor;
  a memory coupled to the processor and configured to store program instructions executable by the processor to implement the method for monitoring the web for fake webpages comprising:

A) providing a plurality of subscriber related keywords stored in a keyword database, employing a crawler to perform a search in an online search engine using a keyword from said keyword database and retrieve a list of URLs of webpages that match said keyword;
  B) employing one or more crawlers to visit the retrieved URL webpages;
  C) analyzing the contents of the webpages of the retrieved URLs and determining if they are fake webpages or not;
  D) alerting the subscriber, when a webpage of the retrieved URLs is determined as a fake page.

Preferably, the system is such that the method for monitoring the web for fake webpages further comprises:
  E) when the determination of step C) is deemed that the webpages are not fake pages, employing a crawler to perform a search in an appropriate online search engine using the following keyword from the keyword database and retrieve a list of URLs of webpages that match said following keyword, and
  F) returning to step B).

BRIEF DESCRIPTION OF THE DRAWINGS

The present invention is illustrated by way of example in the accompanying drawings, in which similar references consistently indicate similar elements and in which:

FIG. 1B illustrates a method in connection to the system websites and blogs monitoring according to an embodiment of the present invention.

FIG. 3A illustrates an embodiment of the system blacklisted IP monitoring according to an embodiment of the present invention.

FIG. 4B illustrates a method in connection to the system social network monitoring according to an embodiment of the present invention.

FIG. 6 illustrates a display example of the system social network monitoring according to an embodiment of the present invention.

DETAILED DESCRIPTION OF THE INVENTION

Figure 1A:
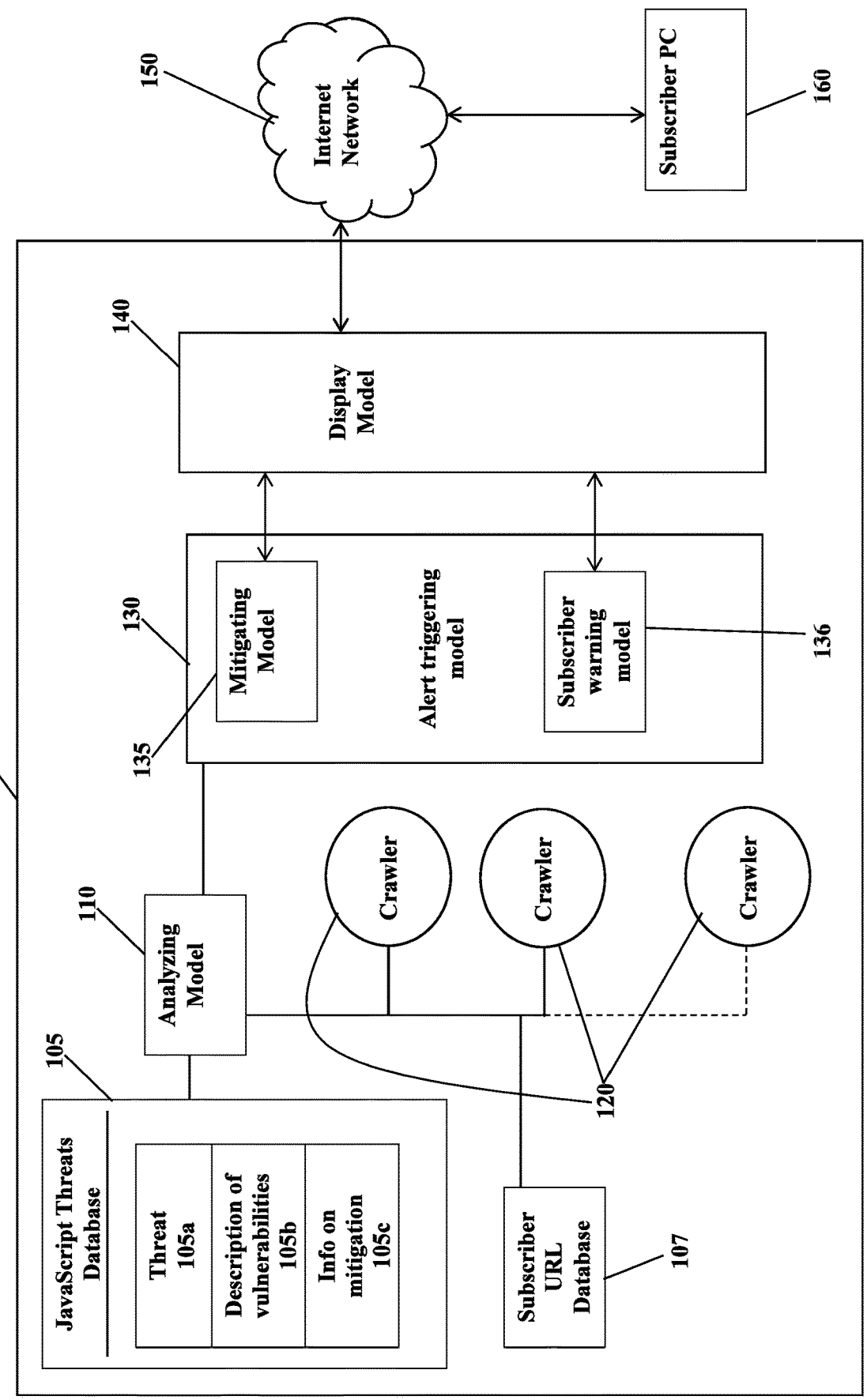
FIG. 1A illustrates an embodiment of the system websites and blogs monitoring according to an embodiment of the present invention.

Several specific details are provided herein, such as examples of devices/components, and methods, to provide a thorough understanding of embodiments of the present invention. A person skilled in the art will understand, however, that the present invention can be implemented without one or more of the specific details or alternatively, well-known details are not described for the sake of clarity (and would be clearly understood by a person skilled in the art).

Some components disclosed herein may be implemented in hardware, software, or a combination thereof (e.g., firmware). Software components may be in the form of computer-readable program code stored in a computer-readable storage medium (e.g. a memory, mass storage device, removable storage device). For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

The present invention relates to a method and system for providing a high level of security for protecting online assets from malicious contents. Several corporate bodies, companies, businesses and various organizations possess a plurality of online assets. The present invention provides means for monitoring the online assets and triggering an alert once one of the assets becomes exposed to malicious content. The malicious content can be automatically mitigated, or mitigated in real-time manually by action of an alerted subscriber.

According to an embodiment of the present invention, the present invention comprises a computer employed in one or more operations of a monitoring system (100, 200, 300, 400, 500). The computer may include a processor, or Advanced Micro Devices, for example. The computer may have one or more buses coupling its various components. The computer may include one or more user input devices (e.g., keyboard, mouse), one or more data storage devices (e.g., hard drive, optical disk, USB memory), a display monitor (e.g., LCD, flat panel monitor, CRT), a computer network interface (e.g., network adapter, modem), and a main memory (e.g., ROM, RAM). The computer network interface may be coupled to a computer network, which includes the Internet. It should be noted that the computer may have less or more components to meet the needs of a particular application. The main memory may include software modules that may be loaded from the data storage device the main memory for execution by the processor.

The computer is adapted to execute computer program modules. As used herein, the term "module" refers to computer program logic and/or data for providing the specified functionality. A module can be implemented in hardware, firmware, and/or software. In one embodiment, the modules are stored on the storage device, loaded into the memory, and executed by the processor.

Databases described herein may comprise a commercially available database or listing running in a computer. Similarly, the crawlers described herein may comprise computer-readable program code running in a computer.

Websites and Blog Malicious Contents

According to a preferred embodiment of the present invention, the present invention comprises a monitoring system 100 for an online assets protection service, as shown in FIG. 1A. The components of the system 100 (and also systems 200, 300, 400, 500 explained hereinafter) running the service may be implemented using one or more computers of the computer described hereinabove (e.g. forming a computer system). The system 100 (and also systems 200, 300, 400, 500 explained hereinafter) has software and hardware interfaces to communicate with subscribing computers 160 via an internet network 150.

The monitoring system 100 receives the main Uniform Resource Locators (URLs) of the websites and blogs of a client subscriber and stores them in a subscriber URL database 107. One or more web crawlers 120 (or protectors) continuously monitor the client's website/blogs for malicious content. Malicious contents on the websites (typically caused and affected by hackers) may include (but not limited to) hosting downloadable software infected with a virus (e.g. computer viruses, worms, Trojans and spyware), spam sending capabilities, phishing site characteristics, performance of activities that are illegal or generally harmful to computers and their users.

The websites are monitored continuously to find vulnerabilities, typically JavaScript vulnerabilities. The web crawlers 120 are employed to visit the websites of the provided URLs (provided by the subscriber URL database 107). As the links are visited, the web crawlers 120 identify all the family related links (i.e. subdomains of the URL webpages by going deep into the general link provided pages) on the associated page(s) and visits them too. The crawlers 120 are employed when visiting the links, to retrieve objects related thereto (e.g. information indicative of whether the URLs are malicious or not). Such retrieved objects include web page contents such as JavaScript or other scripts, web page HTML, binary files, etc.

Objects retrieved by the crawlers are analyzed to determine if the objects are malicious. The system 100 comprises an analyzing model 110 configured to analyze the retrieved objects and determine if they comprise malicious content. The system comprises a threat list database (e.g. JavaScript threats Database 105) which comprises a list of several known malicious vulnerabilities (e.g. codes/features), e.g. list of malicious JavaScript codes 105*a*. The list of malicious JavaScript codes 105*a* may be an internal list (of the service) or a third party list used by the service (e.g. another online service provider). The JavaScript threats Database 105 may comprise records of malicious objects accessible over the Internet.

Each malicious record on the list 105*a* may comprise a corresponding description of vulnerability 105*b* and may comprise a corresponding additional information on mitigation portion 105*c* on how to mitigate it (which can also be a service recommendation to do so and can be specifically indicated therein). The analyzing model 110 receives each retrieved JavaScript code from the crawlers 120 and checks if any of the malicious codes on the list 105*a* appear in the retrieved JavaScript. If the retrieved JavaScript comprises one of the contents in said threat list database then the object is considered malicious and an alert will trigger in the alert triggering model 130.

The alert triggering model 130 (comprised in system 100) is triggered when the analyzing model 110 detects a malicious code. Alert triggering model 130 comprises a mitigating model 135 configured to cure the vulnerability according to the information that appears in the corresponding info on mitigation portion 105*c*. The mitigating model 135 takes an actionable step by curing the vulnerable JavaScript (e.g. by employing a crawler 120 to cure the vulnerable JavaScript) on the corresponding web page. In any case, the crawlers 120 are employed to continue to the next URL saved in the subscriber URL database 107, etc. In general, the crawlers keep on crawling continuously.

For alternative function, the alert triggering model 130 comprises a Subscriber warning model 136 configured to merely warn the subscriber of the malicious code detected. In this case the Subscriber warning model 136 sends the malicious code on the list 105*a*, its corresponding description of vulnerability 105*b* and its corresponding information on its mitigation 105*c* to a display model 140. The display model display is sent to the subscriber's computer 160 via an internet network 150 (e.g. by email or other dedicated application). The subscriber can input into his computer 160 a command to mitigate the threat according to information on its mitigation 105*c*, in which case the alert triggering model 130 receives the command (via internet network 150) and the mitigating model 135 mitigates the threat as described hereinabove. Alternatively, the subscriber can input into his computer 160 a command to ignore the threat in which case nothing is done. Alternatively, the subscriber can input into his computer 160 a command to notify a service operator to review and mitigate the threat in which case the alert triggering model 130 receives the command (via internet network 150) and the service operator is alerted.

The subscriber may choose which of the manners of system function he prefers, i.e. to automatically mitigate according to mitigating model 135 or to be alerted and asked according to Subscriber warning model 136. In any case, even if the automatic mitigation according to mitigating model 135 is chosen, the display of the display model 140 can be sent to the subscriber's computer 160 via internet network 150 showing the malicious threat that occurred and its mitigation.

The JavaScript threats Database 105 is coupled to the analyzing model 110. The URL database 107 is coupled to the crawlers 120 and both are coupled to the analyzing model 110. The analyzing model 110 is coupled to the alert triggering model 130. The alert triggering model 130 is coupled to the display model 140.

A method in connection with this embodiment can be shown in FIG. 1B. The method is for monitoring websites and blogs of subscribers for detecting malicious contents (constituting a malicious threat). The method is to be performed by a computer system and comprises:

A) providing a plurality of URLs provided by the subscriber, sending crawler(s) to navigate to a URL page of the plurality of URLs, to retrieve objects from the plurality of URLs (starting with a first URL and ending with the last URL); (step 190)

B) analyzing objects retrieved by the crawlers from the page of the currently visited URL, to identify whether they are malicious or not by cross-referencing the currently retrieved object with a set of known stored malicious objects; (step 191)

C) if the analyzed objects are deemed not malicious, sending crawler(s) to navigate to the next URL page to retrieve an object therefrom; and return to step B;

D) if the analyzed object is deemed malicious (i.e. if the retrieved object comprises one or more of the known malicious codes/features stored in the threats Database 105 e.g. list of malicious JavaScript codes 105*a*), alerting the subscriber of so (step 192).

Optionally, the method comprises, if the analyzed object is deemed malicious, mitigating the malicious threat (and preferably notifying the subscriber of so). After the threat is mitigated (or after the subscriber is warned), sending crawler(s) to navigate to the next URL page to retrieve an object therefrom; and return to step B.

After all URLs are visited, the first URL is re-visited as in step A, and so on and so forth.

3rd Party Vulnerabilities

Website owners often use a third party operator that runs and manages the client's websites/blogs. The websites/blogs are created and edited by the third party operator using JavaScript codes (or other codes). These codes can be changed by the third party operator thus affecting the website content without notifying the website owner.

Figure 2A:
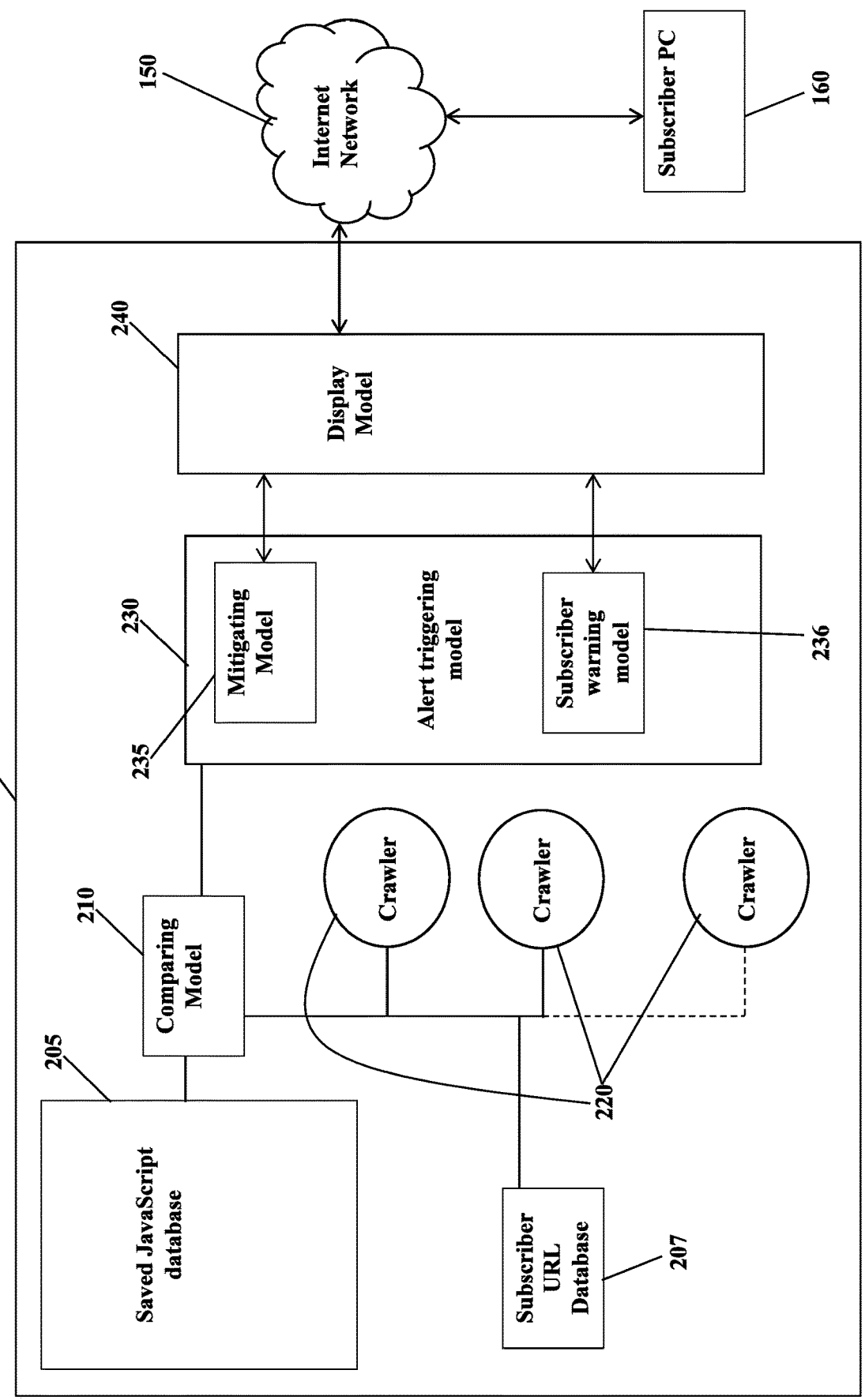
FIG. 2A illustrates an embodiment of the system 3rd Party Vulnerabilities monitoring according to an embodiment of the present invention.

According to this embodiment of the present invention, the system 200 (shown in FIG. 2A) receives the main Uniform Resource Locators (URLs) of the websites and blogs of a certain subscriber. Several types of web crawlers and protectors continuously monitor the subscriber's website/blogs to check if they have been changed.

The monitoring system 200 receives the main Uniform Resource Locators (URLs) of the websites and blogs of a client subscriber and stores them in a subscriber URL database 207. The websites are monitored continuously. The web crawlers 220 are employed to visit the websites of the provided URLs (provided by the subscriber URL database 207). As the links are visited, the web crawlers 220 identify all the family related links (by going deep into the general link provided pages) on the associated page(s) and visits them too. The crawlers 220 are employed when visiting the links, to retrieve objects related thereto. Such retrieved objects include web page contents such as JavaScript or other scripts, web page HTML, binary files, etc. The rest of this embodiment will be explained in relation to JavaScripts, but can also be other objects of the objects hereinabove.

The monitoring system 200 according to this embodiment comprises a saved JavaScript database 205. As an initial step, the crawlers 220 are employed to visit the websites of the provided URLs (provided by the client URL database 207) and retrieve and store the JavaScripts of the visited webpages in the saved JavaScript database 205, each JavaScript with its corresponding URL. After the initial step, the crawler 220 is employed to visit each URLs again (after a certain time) and retrieve the JavaScripts of the visited webpages. The now retrieved JavaScript and the JavaScript in the database 205 of the corresponding URL are compared in a comparing model 210 (comprised in the system 200). If the compared JavaScripts are the same, then this indicates that the webpage has not been changed and the crawler 220 continues to the next URL in the saved JavaScript database 205. If the Javascripts are not the same then this indicates that the webpage has been changed and an alert will trigger (in the alert triggering model 230) and the subscriber is alerted accordingly. In any case, the crawlers 220 are employed to continue to the next URL in the subscriber URL database 207, etc.

The alert triggering model 230 (comprised in system 200) is triggered when the comparing model 210 detects a change in the code. Alert triggering model 230 comprises a mitigating model 235 configured to cure the retrieved code according to the original JavaScript code saved in database 205. The mitigating model 235 takes an actionable step by curing the vulnerable JavaScript (e.g. by employing a crawler 220 to cure the JavaScript) on the corresponding web page.

For alternative function, the alert triggering model 230 comprises a Subscriber warning model 236 configured to merely warn the subscriber of the malicious code detected. In this case the Subscriber warning model 236 sends a warning to the display model 240. The display model 240 display is sent to the subscriber's computer 160 via an internet network 150 (e.g. by email or other dedicated application). The subscriber can input into his computer 160 a command to re-change the code to the original code, in which case the alert triggering model 230 receives the command (via internet network 150) and the mitigating model 235 mitigates the threat as described hereinabove. Alternatively, the subscriber can input into his computer 160 a command to ignore the threat in which case nothing is done. Alternatively, the subscriber can input into his computer 160 a command to notify a service operator to review and mitigate the threat in which case the alert triggering model 230 receives the command (via internet network 150) and the service operator is alerted.

The subscriber may choose which of the manners of system function he prefers, i.e. to automatically mitigate according to mitigating model 235 or to be alerted and asked according to Subscriber warning model 236. In any case, even if the automatic mitigation according to mitigating model 235 is chosen, the display of the display model 240 can be sent to the subscriber's computer 160 via internet network 150 showing the code change and its mitigation.

The display model 230 can display the details of the detected changed JavaScript code and a description of the changed JavaScript code itself (preferably in track changes in relation to the original/first code) and optionally more related information. Preferably, an assessment model can provide an assessment to possible malicious changes made in the code. This is implemented by detecting known malicious codes. The assessment model comprises a database with known malicious codes. The assessment model database may optionally comprise the known malicious codes along with corresponding mitigating response codes that can be automatically applied or manually applied by the subscriber (as explained hereinabove). An example of the mitigation is replacing a known malicious code with an updated code which is not malicious (e.g. a code that has been initially stored in saved JavaScript database 205).

The Saved JavaScript Database 205 is coupled to the comparing model 210. The Subscriber URL database 207 is coupled to the crawlers 220 and both are coupled to the comparing model 210. The comparing model 210 is coupled to the alert triggering model 230. The alert triggering model 230 is coupled to the display model 240.

Figure 2B:
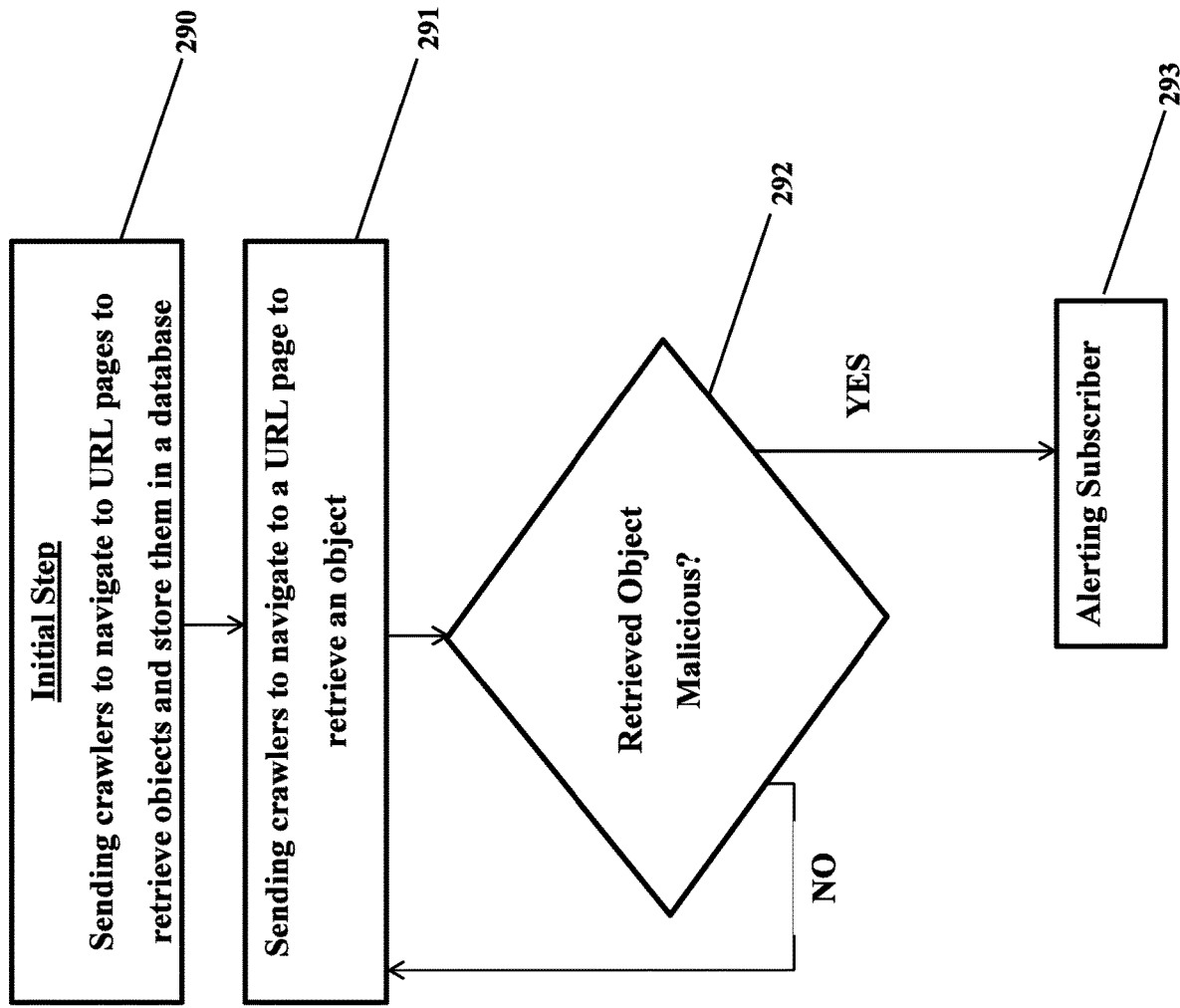
FIG. 2B illustrates a method in connection to the system 3rd Party Vulnerabilities monitoring according to an embodiment of the present invention.

A method in connection with this embodiment can be shown in FIG. 2B. The method is for monitoring websites and blogs of subscribers for detecting malicious contents (constituting a malicious threat). The method is to be performed by a computer system and comprises:

A) providing a plurality of URLs provided by the subscriber, as an initial step—sending crawler(s) to navigate to the URL pages to retrieve objects from each of the plurality of URLs (starting with a first URL and ending with a last URL) and storing the retrieved objects in a database; (Step 290)

B) after a (preferably predetermined) period of time, sending crawler(s) to navigate to a URL page (preferably according to the order in Step A), to retrieve an object from the currently visited URL page (starting with the first URL of the plurality of URLs); (step 291)

C) analyzing the object retrieved by the crawler(s) (from the page of the currently visited URL) to identify whether it is malicious or not by comparing the retrieved object with its corresponding stored object (the object previously retrieved from the same URL site/page visited and stored in the database); (step 292)

C) if the analyzed objects are similar (and thus the current object deemed not malicious), sending crawler(s) to navigate to the next URL page to retrieve an object therefrom; and return to step B;

D) if the analyzed objects are not similar (and thus the current object is deemed malicious), alerting the subscriber of so (step 293).

Optionally, the method comprises, if the analyzed objects are deemed malicious, mitigating the malicious threat (and preferably notifying the subscriber of so). After the threat is mitigated (or after the subscriber is warned), sending crawler(s) to navigate to the next URL page to retrieve an object therefrom; and return to step B.

After all URLs are visited, the first URL is re-visited as in step A, and so on and so forth.

Blacklisted IP, URL and Domain

According to an embodiment of the present invention the system 300 comprises an IP database comprising the subscriber's computer related items e.g.—IP addresses, URLs and Domains. These computer related items typically relate to codes such as IP addresses, URLs and Domains. System 300 service provides online Protection by monitoring the subscriber's computer related items (e.g. devices) IP addresses and triggers an alert if an IF is found in a blacklist (e.g. Spam, Malware blacklists). IPs, URLs and Domains being part of a spam blacklist can cause severe issues (e.g. connectivity, business impact) to the subscriber, such as email and website disruption.

According to this embodiment of the present invention, the system 300 (shown in FIG. 3A) receives the IP addresses of the computer related/online assets items (e.g. devices) of a certain subscriber, and his URLs and domains.

The monitoring system 300 receives the IP addresses, and the URTs and domains of a client subscriber and stores them in an IP address-URL-Domain database 307. The monitoring system 300 comprises a blacklist URL database 305 with known blacklists websites URLs. This database 305 can be updated. The system 300 visits each of the websites of the blacklist URL database 305 (e.g. by using crawlers). The monitoring system 300 according to this embodiment comprises a comparing model 310. The IP addresses, the URLS and the Domains in the IP address-URL-Domain database 307 are cross-referenced (in the comparing model 310) with the IP addresses, URLs and Domains that appear in the blacklist URL website visited. The first URL in the blacklist URL database 305 is visited. If one of the IP addresses, URLs, Domains in the IP address-URL-Domain database 307 appears in the visited site then an alert will trigger (in the alert triggering model 330). If none of the IP addresses, URLs, Domains, in the IP-URL-Domain address database 307 appear in the visited site then the system 300 visits the next URL in the blacklist URL database 305, etc. After all URLs in the blacklist URL database 305 are visited, the cycle restarts and the first URL is visited again, etc. The order of sites visits may vary according to a certain preference, as known in the art.

The alert triggering model 330 (comprised in system 300) is triggered when the comparing model 310 finds that one of the client subscriber's IP address, URL or Domain in the IP-URL-Domain address database 307 appears one of the visited websites. Alert triggering model 330 comprises a mitigating model 335 configured to automatically submit a request to be taken off the blacklist.

For alternative function, the alert triggering model 330 comprises a Subscriber warning model 336 configured to warn the subscriber of the appearance of one of his IP addresses, URLs, or Domains in a blacklist. In this case the Subscriber warning model 336 sends a warning to the display model 340. The display model 340 display is sent to the subscriber's computer 160 via an internet network 150

(e.g. by email or other dedicated application). The subscriber can submit a request to an appropriate destination in order to be taken off the blacklist.

The subscriber may choose which of the manners of system function he prefers, i.e. to automatically mitigate according to mitigating model 335 or to be alerted according to Subscriber warning model 336. In any case, even if the automatic mitigation according to mitigating model 335 is chosen, the display of the display model 340 can be sent to the subscriber's computer 160 via internet network 150 showing the IP appearing in the blacklist and the mitigation (request sent to be taken off blacklist).

The Blacklist URL Database 305 is coupled to the comparing model 310. The IP-URL-Domain database 307 is coupled the comparing model 310. The comparing model 310 is coupled to the alert triggering model 330. The alert triggering model 330 is coupled to the display model 340.

Figure 3B:
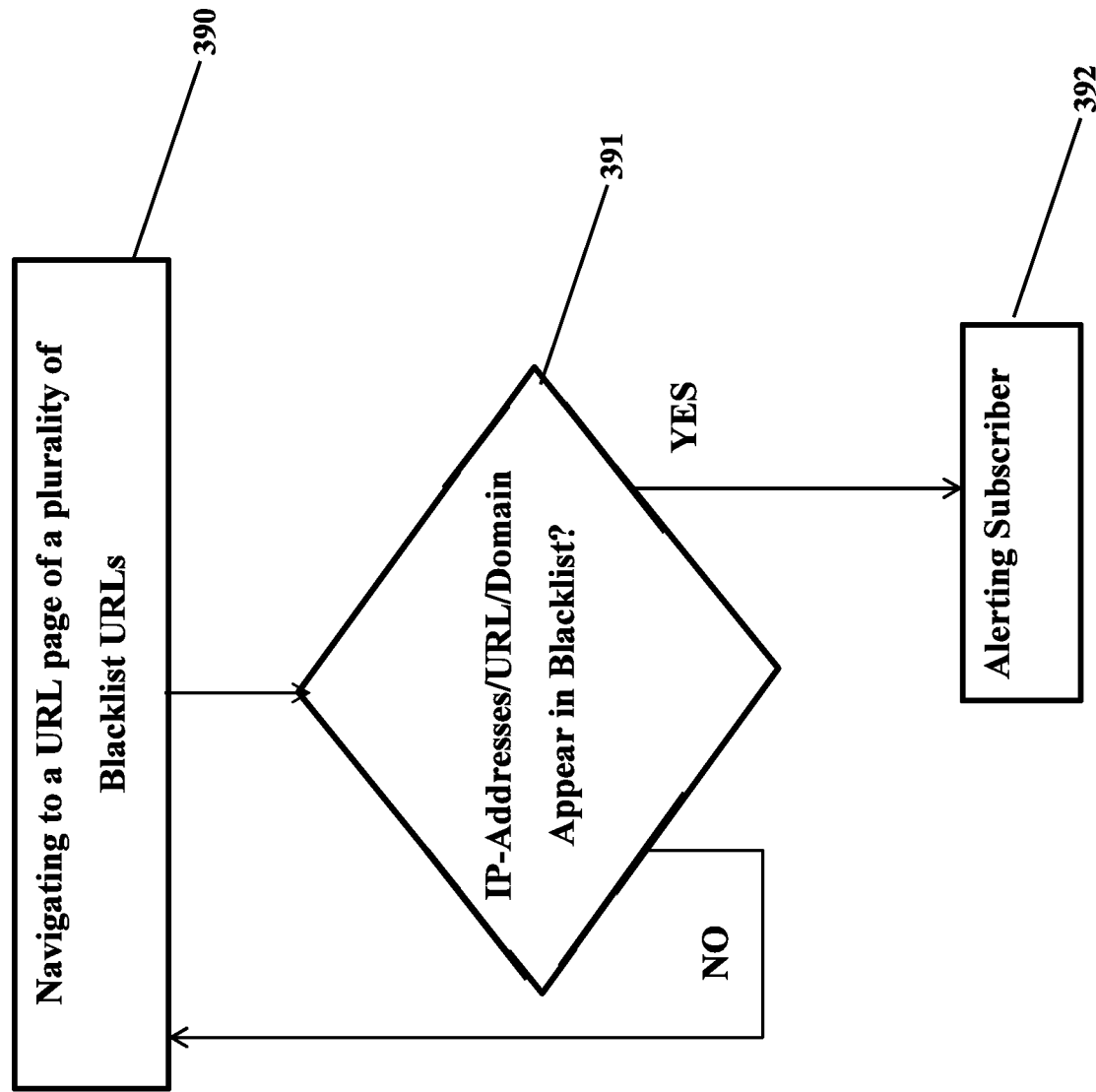
FIG. 3B illustrates a method in connection to the system blacklisted IP monitoring according to an embodiment of the present invention.

A method in connection with this embodiment can be shown in FIG. 3B. The method is for monitoring blacklists on the web to see is a subscriber's IP addresses, URLs and Domains appear in the blacklists and to warn the subscriber of so (and optionally take action to remove the IP addresses/URLs/Domains from the blacklists. The method is to be performed by a computer system and comprises:

A) navigating to a URL page of a plurality of URLs wherein the URL's web pages comprise blacklists (starting with a first URL and ending with the last URL); (step 390)

B) providing a list of a subscriber's IP addresses, URLs and Domains, cross-referencing the subscriber's IP addresses, URLs and Domains with the IP addresses, URLs and Domains that appear in the blacklist of the URL website (currently visited); (step 391)

C) if none of the subscriber's IP addresses, URLs and Domains, appear in the visited site blacklist, navigating to the next URL page of the plurality of URLs; and return to step B;

D) if a subscriber's IP addresses, URLs and Domains, appear in the visited site blacklist, alerting the subscriber of so (step 392).

Optionally, the method comprises, if the subscriber's IP addresses, URLs and Domains, appear in the visited site blacklist, submitting a request to be taken off the blacklist (and preferably notifying the subscriber of so).

After the submission (or after the subscriber is warned), navigating to the next URL page; and return to step B.

After all URLs are visited, the first URL is re-visited as in step A, and so on and so forth.

Social Networks Account Protection

The present invention also relates to monitoring various social network official accounts of a subscriber for various issues. The present invention is configured to monitor the subscriber's posts for profanity triggering an alert e.g. when a Facebook comment contains foul language is written on the subscriber's official account page. Also, the present invention is configured to monitor the subscriber's posts for broken links. Also, the present invention is configured to monitor any posts, comments or tweets that contain malicious links and trigger an alert on them for further mitigation. Malicious links can either be redirections to phishing sites, or even trying to download malware.

Figure 4A:
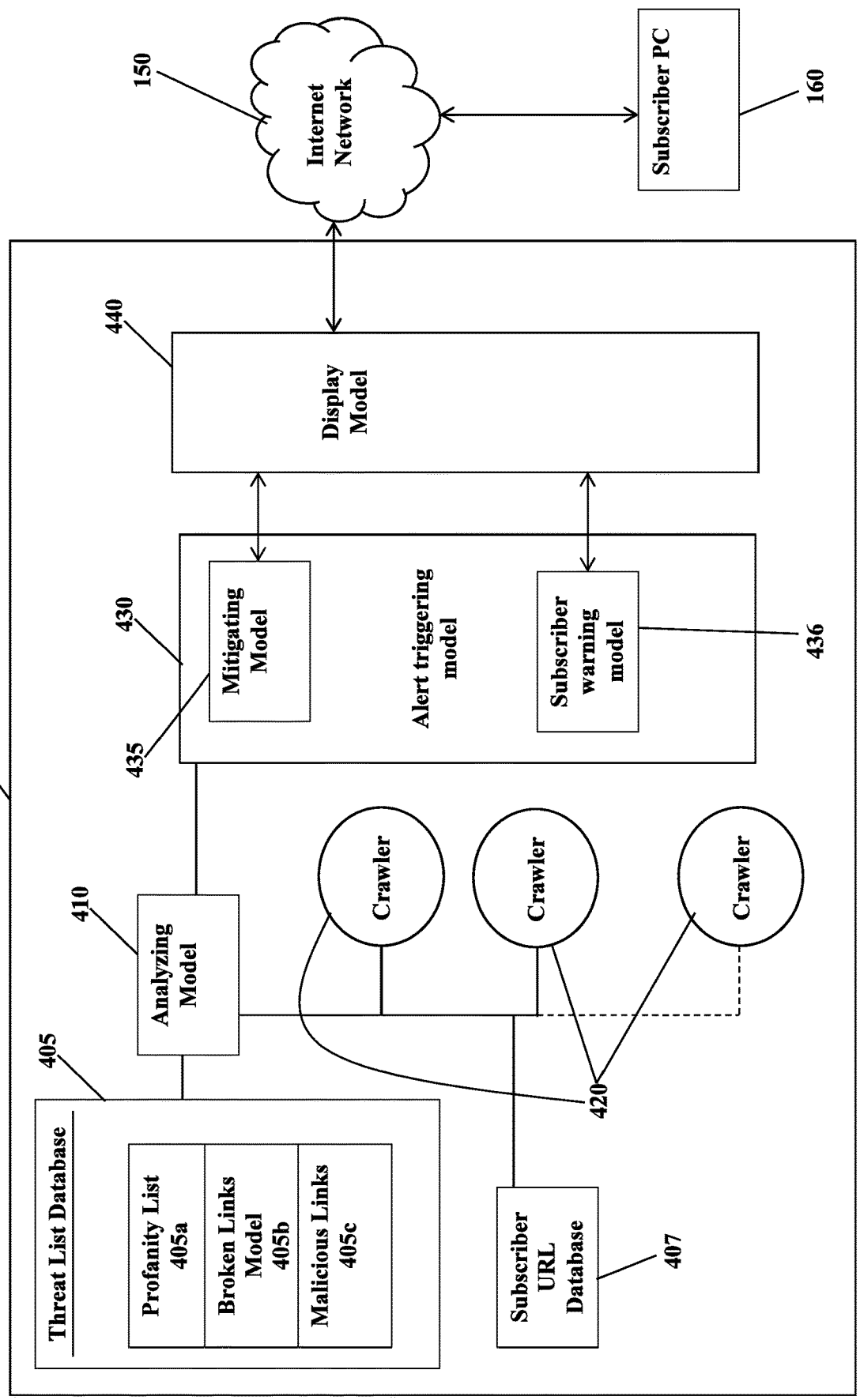
FIG. 4A illustrates an embodiment of the system social network monitoring according to an embodiment of the present invention.

According to a preferred embodiment of the present invention, the monitoring system 400 receives the main Uniform Resource Locators (URLs) of the social networks of a client subscriber and stores them in a subscriber URL database 407 (shown in FIG. 4A). One or more crawlers 420 (or protectors) continuously monitor the client's social networks.

The crawlers 420 are employed to visit the Social networks of the provided URLs (provided by the subscriber URL database 407). As the links are visited, the crawlers 420 identify all the family related social network links (by going deep into the general link provided pages) on the associated page(s) and visits them too. The crawlers 420 are employed when visiting the links, to retrieve written posts on the social networks.

The written posts retrieved by the crawlers are analyzed to determine if they contain harmful or unwanted content. The system 400 comprises an analyzing model 410 configured to analyze the retrieved written posts. The system comprises a threat list database 405 which comprises a list of several known profanity words/combinations 405a, a broken links model 405b and a malicious links database 405c comprising several known malicious links. The analyzing model 410 receives each retrieved written post from the crawlers 420 and checks three aspects.

A) If any of the profanity words/combinations of list 405a appear in the retrieved written post. If the retrieved written post comprises one of the contents in said profanity words/combinations list 405a then an alert will trigger in the alert triggering model 430.

B) If the retrieved written post comprises a broken link (e.g. according to a definition in the broken links model 405b) then an alert will trigger in the alert triggering model 430.

C) If any of the malicious links in malicious links database 405c appear in the retrieved written post. If the retrieved written post comprises one of the contents in said malicious links database 405c then an alert will trigger in the alert triggering model 430.

If none of the above occur (i.e. if there are no profanity word/combinations found and no broken links found and no malicious links found) then the next written post is checked and if all the written posts are checked (e.g. from the last time checked or from a certain time) the crawlers 420 are employed to continue to the next URL in the subscriber URL database 407, etc.

The alert triggering model 430 (comprised in system 400) is triggered when one or more of the above options (A, B, C) occur. Alert triggering model 430 comprises a mitigating model 435 configured to cure the problematic occurrence. The mitigating model 435 takes an actionable step by curing (e.g. employing the crawler 420 to cure) according to the following options respectively (mutatis mutandis):

A) Delete/hide the profanity words/combinations from the post or delete the entire post.

B) Delete/hide the broken link from the post or delete the entire post.

c) Delete/hide the malicious link from the post or delete the entire post. There is also an option that the system 400 reports the actual malicious links/domains to an appropriate authority (e.g. crawlers 420 are employed to report).

For alternative function, the alert triggering model 430 comprises a Subscriber warning model 436 configured to merely warn the subscriber of the problematic occurrence detected. In this case the Subscriber warning model 436 sends the problematic occurrence which appears (i.e. profanity words/combinations, the broken link or malicious link) to a display model 440. The display model 440 display is sent to the subscriber's computer 160 via an internet network 150 (e.g. by email or other dedicated application).

The subscriber can input into his computer 160 a command to delete the problematic occurrence, in which case the alert triggering model 430 receives the command (via internet network 150) and the mitigating model 435 mitigates the threat as described hereinabove. Alternatively, the subscriber can input into his computer 160 a command to ignore the problematic occurrence in which case nothing is done. Alternatively, the subscriber can input into his computer 160 a command to notify a service operator to review and mitigate the problematic occurrence in which case the alert triggering model 430 receives the command (via internet network 150) and the service operator is alerted.

The subscriber may choose which of the manners of system function he prefers, i.e. to automatically mitigate according to mitigating model 435 or to be alerted and asked according to Subscriber warning model 436. In any case, even if the automatic mitigation according to mitigating model 435 is chosen, the display of the display model 440 can be sent to the subscriber's computer 160 via internet network 150 showing the problematic occurrence that occurred and its mitigation. An example of a display displayed on the display model 440 can be shown in FIG. 6.

This embodiment is not limited only to items 405a, 405b and 405c. Additional (or alternative) features may be subject for remediation according to the subscriber's requirements. The subscribers can choose what to delete and this could be stored in another requirement item in threat list database 405. The written posts will be checked according to the subscriber's requirement e.g. if the retrieved written post comprises comments relating to a certain category (e.g. wherein a subscriber's competitor is mentioned according to keywords relating to the competitor stored in threat list database 405), if any external URLs that were posted appear, etc. The requirements may be is a list of keywords that appear in the retrieved written posts and thus the list of keywords is saved in a category in the threat list database 405 and this category is also checked by the analyzing model 410 mutatis mutandis.

The threat list Database 405 is coupled to the analyzing model 410. The Subscriber URL database 407 is coupled to the crawlers 420 and both are ccupled to the analyzing model 410. The analyzing model 410 is coupled to the alert triggering model 430. The alert triggering model 430 is coupled to the display model 440.

A method in connection with this embodiment can be shown in FIG. 4B. The method is for monitoring social network accounts of subscribers for detecting unwanted contents (optionally constituting a malicious threat). The method is to be performed by a computer system and comprises:
 A) providing a plurality of URLs provided by the subscriber, sending crawler(s) to navigate to a URL page of the plurality of URLs, to retrieve written posts from the plurality of URLs (starting with a first URL and ending with the last URL); (step 490)
 B) analyzing written posts retrieved by the crawlers from the page of the currently visited URL, to identify whether the written posts contain one or more of the following:
  1) profanity;
  2) broken links;
  3) malicious links;
  by respectively
   1) comparing the currently retrieved written posts with a set of a known stored list of profanity,
   2) checking if the currently retrieved written posts meet with a broken links model definition; or
   3) comparing the currently retrieved written posts with a set of a known stored list of malicious links; (step 491)
 C) if the analyzed written posts are deemed not having profanity, broken links or malicious links (i.e. the retrieved posts do not (1) contain features that appear in the profanity list 405a; (2) meet with the definition of a broken links model 405b; or (3) contain features that appear in the malicious links database 405c), sending crawler(s) to navigate to the next URL page to retrieve written posts therefrom; and return to step B;
 D) if the analyzed written posts are deemed having profanity, or broken links or malicious links (i.e. the retrieved posts (1) contain features that appear in the profanity list 405a; (2) meet with the definition of a broken links model 405b; or (3) contain features that appear in the malicious links database 405c), alerting the subscriber of so (step 492).

Optionally, the method comprises, if the analyzed written posts are deemed having profanity, or broken links or malicious links, mitigating and curing the social network account by (1) deleting/hiding the profanity feature; (2) deleting/hiding the broken link; or (3) deleting/hiding the malicious link (and preferably notifying the subscriber of so). After the mitigation (or after the subscriber is warned), sending crawler(s) to navigate to the next URL page to retrieve written posts therefrom; and return to step B.

After all URLs are visited, the first URL is re-visited as in step A, and so on and so forth.

Fake Pages

Threat actors (e.g. hackers) may create Fake Pages in social networks (e.g. Facebook, Twitter) or other webpages disguising as different entities such as individuals, companies, businesses and other. These fake pages often provide disinformation about these entities and contain various harmful contents used for deceiving users entering these social networks. Some of these fake pages post themselves malicious posts i.e., links that attempt to phish info, use the brand for ulterior motives—usually to fool the users to give out information or divert business transactions, etc.

The present invention provides means to automatically discover these pages that are attempting to imitate and sometime replace official accounts of the legitimate bodies. These community pages can also be tagged as fake pages if their creator is posting malicious content that can be seen by users as the client's content.

It should be noted that there are legit pages that are "fan pages" of a sort to the real page/product. These pages usually will just help the reliability of the original page, and contribute to the company's social presence. No action is taken against these fan pages. However, there are some dangerous pages that are legit in nature, but the users on these pages are posting malicious comments of some sort (phishing links, malware attempts, etc.) and the present invention is configured to mitigate these threats.

Figure 5A:
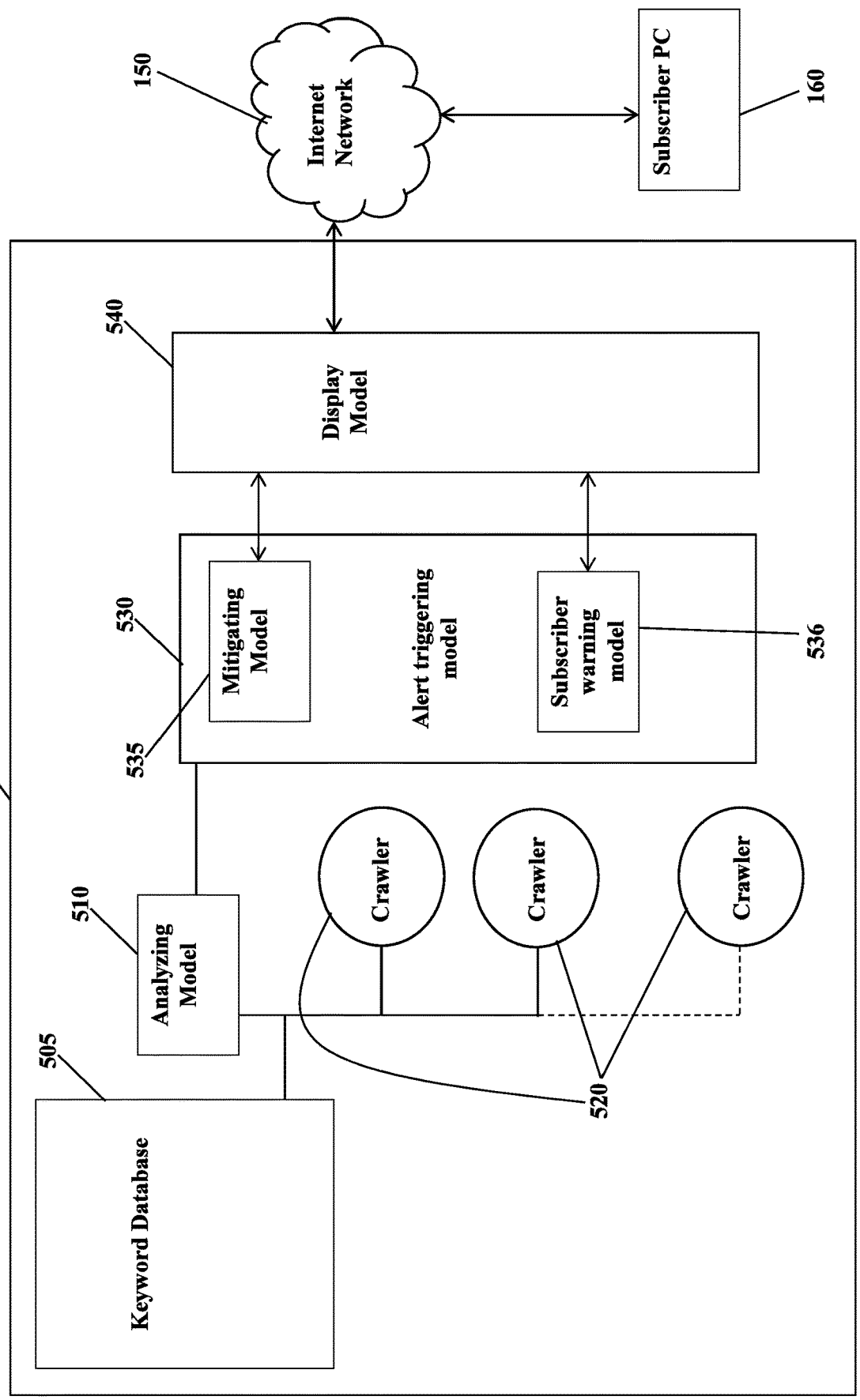
FIG. 5A illustrates an embodiment of the system fake pages monitoring according to an embodiment of the present invention.

According to a preferred embodiment of the present invention, the monitoring system 500 receives keywords relevant to the subscriber's brand/product (e.g. name of the brand/business/company/organization and some nicknames it might have as well as usual mistypings' of said names—herein also referred to as "subscriber related keywords") and stores them in a keyword database 505 (FIG. 5A).

The web crawlers 520 are employed to perform a search in an appropriate online search engine using the keywords in keyword database 505. An especially efficient search engine for this purpose is Facebook's Open Graph API. The crawlers 520 retrieve a list of URLs (links) of all webpages that match the keywords (i.e. that have a certain relevance to the keyword).

The system 500 comprises an analyzing model 510 configured to visit the retrieved links and analyze their content. This analyzing may comprise using complicated algorithms that employ texts similarities, image processing, content analyzing as well as other comparisons to the real original social network pages or relating to the brand/product/company/organization. If the first retrieved link is deemed irrelevant, then the next link retrieved is analyzed, etc.

According to one embodiment of the present invention, the search engine is dedicated for searching social media webpages wherein the URLs are of webpages that are social media webpages and wherein the analyzing comprises: obtaining the content posted by the social media webpage owner; comparing said obtained content with stored malicious content, e.g. a database comprising malicious content (e.g. malicious links) and determining (e.g. by comparison) whether the obtained content comprises the malicious content.

If, according to analyzing model 510, a retrieved link is deemed relevant (i.e. indicating the presents of a fake page), then an alert will trigger in the alert triggering model 530.

The alert triggering model 530 (comprised in system 500) is triggered when retrieved link is deemed relevant. Alert triggering model 530 comprises a mitigating model 535 configured to mitigate the fake page comprising informing the social network hosting the fake page to permanently remove it. For example, fake pages can be reported to Facebook to take them down. The reporting can be done automatically by analyzing model. 510 sending an appropriate message (e.g. via email or via the social network webpage) to the social network hosting the fake page. Another aspect of the mitigation is to report abusing domains to hosting providers and ISPs in order to take them down. Typically, malicious links are hosted somewhere in the fake page usually without the provider's awareness of such activity; therefore hosting providers and ISPs cooperate in taking these fake pages down.

For alternative function, the alert triggering model 530 comprises a Subscriber warning model 536 configured to merely warn the subscriber of the fake page detected. In this case the Subscriber warning model 536 sends the fake page to a display model 540. The display model 540 display is sent to the subscriber's computer 160 via an internet network 150 (e.g. by email or other dedicated application). The subscriber can input into his computer 160 a command to mitigate the fake page, in which case the alert triggering model 530 receives the command (via internet network 150) and the mitigating model 535 mitigates the fake page as described hereinabove. Alternatively, the subscriber can input into his computer 160 a command to ignore the fake page in which case nothing is done. Alternatively, the subscriber can input into his computer 160 a command to notify a service operator to review and mitigate the fake page in which case the alert triggering model 530 receives the command (via internet network 150) and the service operator is alerted.

The subscriber may choose which of the manners of system function he prefers, i.e. to automatically mitigate according to mitigating model. 535 or to be alerted and asked according to Subscriber warning model 536. In any case, even if the automatic mitigation according to mitigating model 535 is chosen, the display of the display model 540 can be sent to the subscriber's computer 160 via internet network 150 showing the fake page occurrence and its mitigation. An example of a display displayed on the display model 540 can be shown in FIG. 7.

The Keyword Database 505 is coupled to the analyzing model 510. The crawlers 520 are coupled to the analyzing model 510. The analyzing model 510 is coupled to the alert triggering model 530. The alert triggering model 530 is coupled to the display model 540.

Figure 5B:
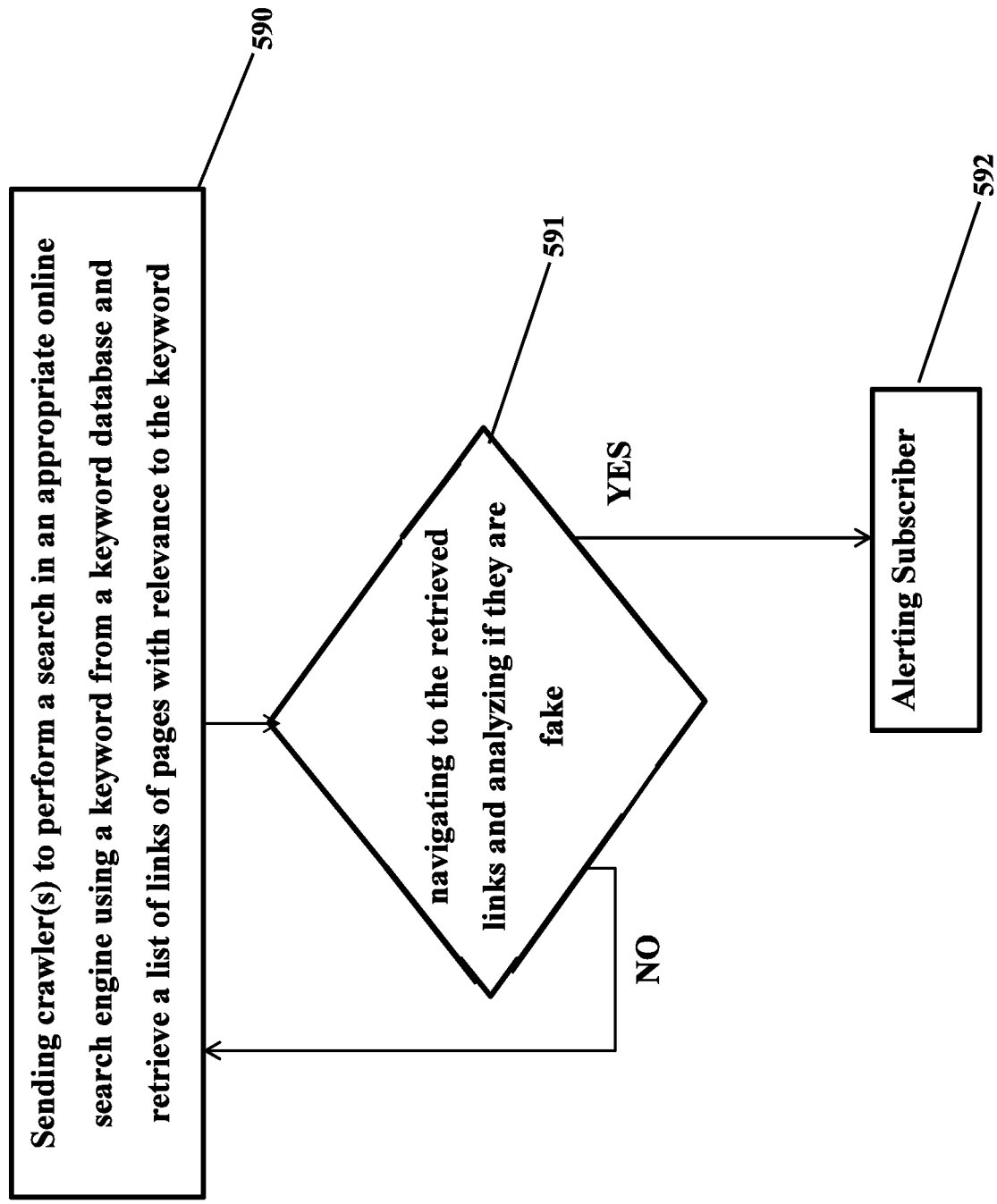
FIG. 5B illustrates a method in connection to the system fake pages monitoring according to an embodiment of the present invention.

A method in connection with this embodiment can be shown in FIG. 5B. The method is for monitoring the web for fake pages disguising themselves as legitimate pages of a subscriber. The method is to be performed by a computer system and comprises:

A) providing a plurality of keywords relevant to the subscriber's brand/product stored in a database, sending crawler(s) to perform a search in an appropriate online search engine using a keyword from the keyword database and retrieve a list of links of pages that match the keyword i.e. that are relevant to the keyword (starting with a first keyword in the database and eventually ending with a last);

B) navigating to the retrieved links and analyze each one of their contents to determine if they are fake pages; (step 591)

C) if the analyzed pages are deemed not fake, sending crawler(s) to perform a search in an appropriate online search engine using the next keyword from the keyword database; and return to step B;

D) if an analyzed page is deemed fake, alerting the subscriber of so (step 592).

Optionally, the method comprises, if an analyzed page is deemed fake, informing the social network hosting the fake page to permanently remove it (and preferably notifying the subscriber of so). After informing, (or after the subscriber is warned), sending crawler(s) to perform a search in an appropriate online search engine using the next keyword from the keyword database; and return to step B.

After all keywords in the keyword database are used, the method comprises sending crawler(s) to perform a search in an appropriate online search engine using the first keyword again from the keyword database, and retrieve a list of links of all pages that match the first keyword, as in step A, and so on and so forth.

Display

Figure 6:
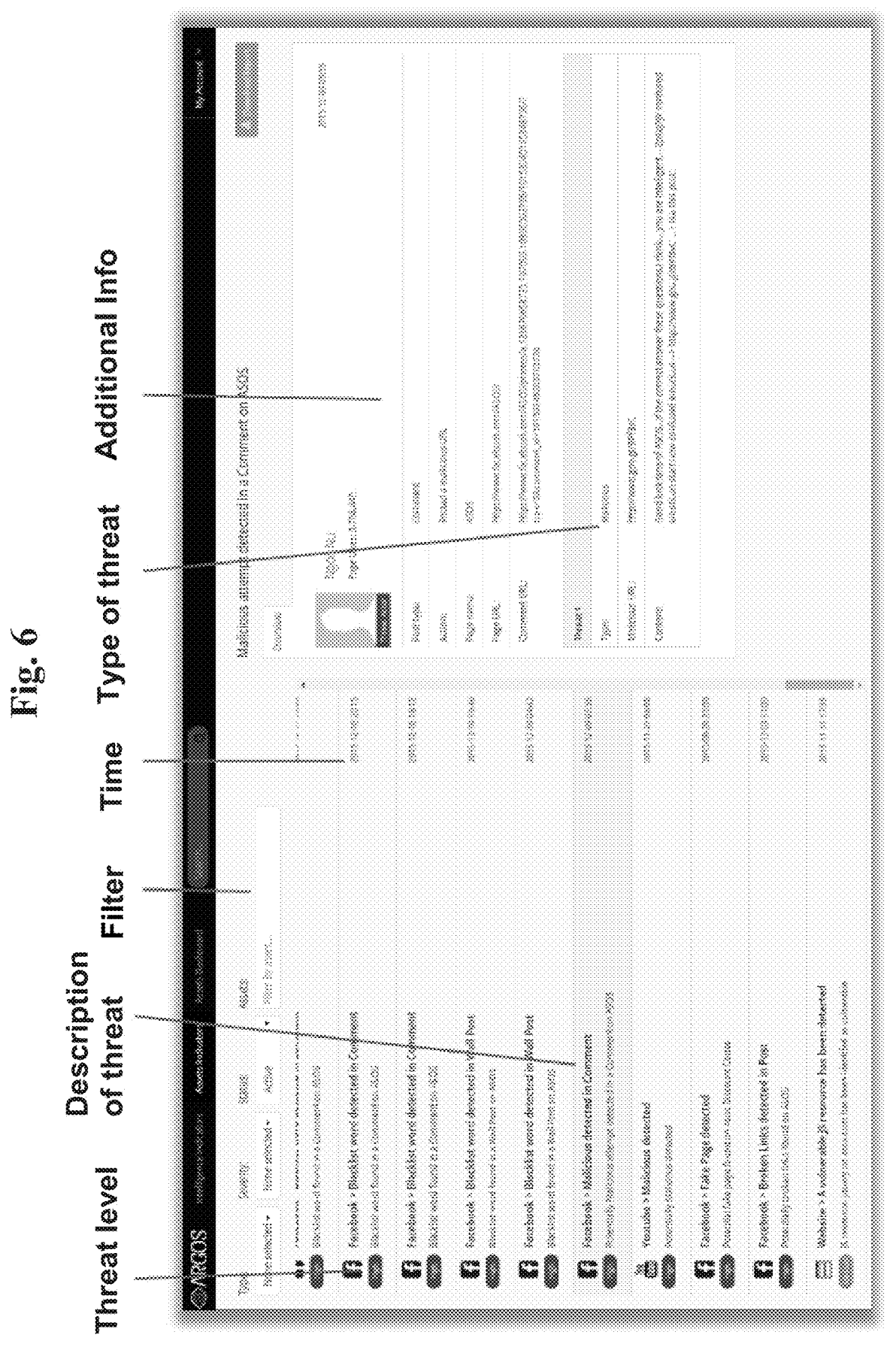

As said, an example of a display displayed on the display model 440 can be shown in FIG. 6. Similar displays may be applied to all the embodiments described herein, Mutatis Mutandis. The display shows an Assets Indicator window screen, wherein a subscriber or one of the system service operators can view the various alerts raised on the subscriber's online assets and input commands accordingly as explained hereinabove. There are optional drop-down menus at the upper left of the screen to filter the incoming alerts to be shown on the display by an Asset Type (e.g. Facebook, Twitter, etc.), Severity or Threat Level (e.g. Low, Medium, High), Status (e.g. Active, Resolved), and filter by Assets.

The display lists malicious activity and provides information about the threat. The display is configured to display which assets are targeted, a summary of the event, the source of the activity, the threat level, and the date and time when the activity occurred.

The display comprises an overview tab on the right side. Clicking one of the alerts raised in the list of threats displays an overview of the malicious activity in the overview tab. Each alert type contains a different set of information with the goal to assist the subscriber or the system service operator to determine the threat severity and the steps to mitigate this alert. The information in this example is from a Facebook comment that contains a malicious link from the official Facebook page of the client and includes a Type of post (malicious), Threat action (posted a malicious URL), The name of the page, URL of the page, URL of the threat and Content of the threat. The subscriber or the system service operator can take an action and mitigate the threat as explained hereinabove or determine that a threat has been resolved, i.e., indicating that it no longer poses a danger.

Dashboard

Figure 7:
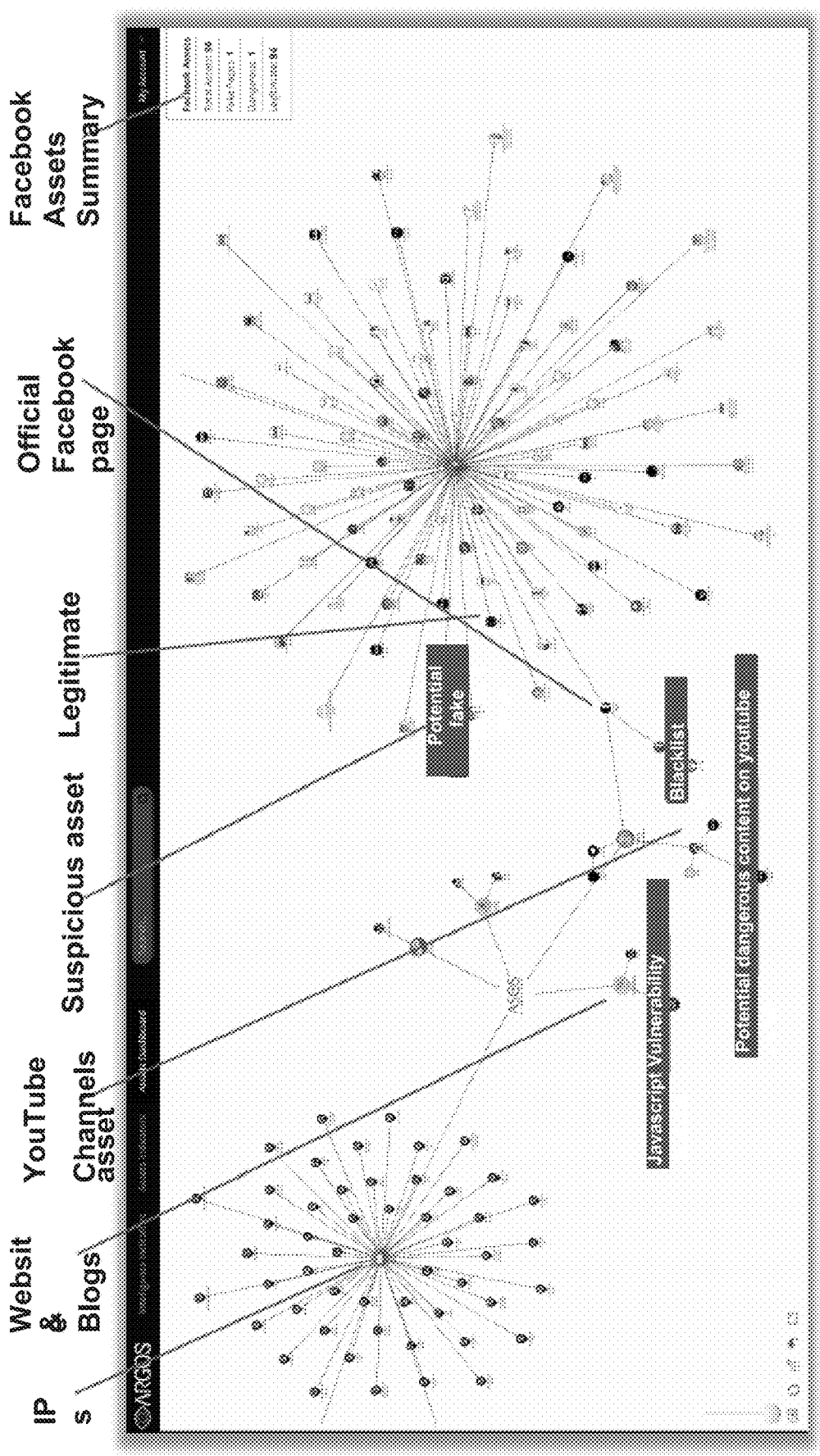
FIG. 7 illustrates an example of a display dashboard according to an embodiment of the present invention.

FIG. 7 shows a display image of an Assets Dashboard providing a visual summary of all online assets of the subscriber. This could be part of the display in the display model sent to a subscriber in relation to one or more of the embodiments explained hereinabove. This can provide the subscriber a general picture of all the online assets in the display models. This can provide the subscriber a visual aspect (and a general perspective) of various threats occurring at the same time and to choose which alert to deal with first. The system also enables drilling down to each asset, including community assets. For example a red dot may indicate assets with alerts. Clicking an icon of an asset from the dashboard can take the subscriber to the Assets Indicators screen filtered on the alerts of this specific asset (exemplified in FIG. 6). Optionally clicking on the asset may take the subscriber to the actual URL related page. Summary reports of threats may be downloaded (shown on the right side of the screen) e.g. in HTML format.

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A protection system for detecting an inclusion of one or more of subscribers' legitimate domain addresses within publicly published blacklists on the web, the system comprising:
   A) a subscribers' list including, for each subscriber, one or more of the subscriber's owned legitimate I.P. addresses, URLs or Domains;
   B) a list of URLs of sites' that publicly publish blacklists, each said blacklist includes I.P. addresses, URLs or Domains of malicious sites;
   C) a monitoring module that, for each subscriber, is configured to: (i) access a site from said list that publicly publishes a blacklist of malicious domains; (ii) scan the blacklist published by said site to determine whether one or more of the subscriber's legitimate I.P. addresses, URLs or Domains appears within the blacklist; and (iii) alert the subscriber upon determination that one or more of his owned legitimate I.P. addresses, URLs or Domains appears within the scanned blacklist; and, repeat (i)-(iii) for additional sites from said list of sites' that publicly publish blacklists.

2. The system of claim 1, wherein upon each positive determination, said monitoring module submits a request to the respective site for removal from the blacklist.

3. The system of claim 1, wherein the alert by the monitoring module to the subscriber further comprises a display model indicative of the computer related asset code appearing in the blacklist.

* * * * *